US012652326B2

(12) United States Patent
Qiao et al.

(10) Patent No.: US 12,652,326 B2
(45) Date of Patent: Jun. 9, 2026

(54) INDICATOR FOR AVOIDING SPEECH CONFLICTION IN A COMMUNICATIONS SESSION WHEN NETWORK LATENCY IS HIGH

(71) Applicant: CITRIX SYSTEMS, INC., Fort Lauderdale, FL (US)

(72) Inventors: Zongpeng Qiao, Nanjing City (CN); Dan Hu, Nanjing City (CN); Ke Xu, Nanjing City (CN); Jia Yin, Nanjing City (CN)

( * ) Notice: Subject to any disclaimer, the term of this patent is extended or adjusted under 35 U.S.C. 154(b) by 359 days.

(21) Appl. No.: 17/813,340

(22) Filed: Jul. 19, 2022

(65) Prior Publication Data

US 2024/0007512 A1    Jan. 4, 2024

Related U.S. Application Data

(63) Continuation of application No. PCT/CN2022/102411, filed on Jun. 29, 2022.

(51) Int. Cl.
| | |
|---|---|
| *H04L 65/4038* | (2022.01) |
| *G08B 5/36* | (2006.01) |
| *G10L 25/78* | (2013.01) |
| *G10L 25/87* | (2013.01) |
| *H04L 43/0852* | (2022.01) |
| *H04L 65/1069* | (2022.01) |

(52) U.S. Cl.
CPC ............ *H04L 65/4038* (2013.01); *G08B 5/36* (2013.01); *G10L 25/78* (2013.01); *G10L 25/87* (2013.01); *H04L 43/0852* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 2005/0171768 A1* | 8/2005 | Gierach | G10L 25/87 704/E11.005 |
| 2022/0385491 A1* | 12/2022 | Morris | H04L 12/1822 |
| 2023/0125307 A1* | 4/2023 | O'Connell | G10L 17/04 704/231 |

* cited by examiner

*Primary Examiner* — Antim G Shah

(57) ABSTRACT

A computing system includes first and second client computing devices accessing a communications network to establish a communications session. The first client computing device operates an audio analysis agent to determine network latency within the communications session based on communications with an audio analysis agent in the second client computing device. In response to the network latency exceeding a latency threshold, audio input from a user of the first client computing device is analyzed to determine a speaking status of the user. The audio analysis agent generates an indicator command message for the second client computing device based on the determined speaking status of the user. The second client computing device displays an indicator based on the indicator command message indicating when a user of the second client computing device can speak to avoid speech confliction with the user of said first client computing device.

18 Claims, 13 Drawing Sheets

INDICATOR FOR AVOIDING SPEECH CONFLICTION IN A COMMUNICATIONS SESSION WHEN NETWORK LATENCY IS HIGH

TECHNICAL FIELD

The present disclosure relates to computing systems, and more particularly, to a computing system that provides an indicator for avoiding speech confliction in a communications session when network latency is high.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer.

Using client-server technology, a virtualized desktop may be stored in and administered by a remote server, rather than in the local storage of a computing device. The computing device accesses the virtualized desktop in a remote computing session with the server. The remote computing session allows a user to access resources. The resources, for example, include SaaS and web apps, desktops, files and data. At times, a user may launch a collaboration app in order to share screen content of their virtual desktop with other users within the organization participating in a collaboration session.

SUMMARY

A computing system includes first and second client computing devices configured to access a communications network to establish a communications session. Each client computing device includes an audio analysis agent.

The first client computing device is configured to operate the audio analysis agent to determine network latency within the communications session based on communications with the audio analysis agent in the second client computing device. In response to the network latency exceeding a latency threshold, audio input from a user of the first client computing device is analyzed to determine a speaking status of the user. The audio analysis agent generates an indicator command message for the second client computing device based on the determined speaking status of the user. The second client computing device is configured to display an indicator based on the indicator command message indicating when a user of the second client computing device can speak to avoid speech confliction with the user of the first client computing device.

Determining the network latency may be further based on the audio analysis agent in the first client computing device transmitting a monitoring message with a start timestamp. The audio analysis agent in the second client computing device may apply an end timestamp upon receipt of the monitoring message. A time gap between the start and end timestamps is determined, and then the time gap is compared to the latency threshold.

The computing system may further include additional client computing devices participating in the communications session. The audio analysis agent in the first client computing device may be further configured to communicate with the audio analysis agents in the additional client computing devices to determine the network latency for each additional client computing device within the communications session, and select a worst network latency from among all of the determined network latencies to be used to compare to the latency threshold.

In response to the network latency exceeding the latency threshold, the audio analysis agent in the first client computing device may further communicate with the audio analysis agent in the second client computing device to enable the indicator for the second client computing device.

The network latency may be periodically determined, and in response to the network latency being less than the latency threshold, the indicator is disabled by the first client computing device.

The indicator may display at least one of colors, text or graphics to the user of the second client computing device to indicate the speaking status of the user of the first client computing device.

The colors may include a red color indicating that the user is talking, a yellow color indicating that there is a pause in the user speaking, and a green color indicating that the user has stopped talking based on the pause being extended.

The first and second client computing devices may each include an audio buffer. The indicator command message may include a size of the audio buffer in the first client computing device representing audio data that has not been sent yet to the second computing device, and an indicator command. The indicator command is for the indicator in the second client computing device to display a speaking status of the user of the first client computing device.

In response to there being a pause in the user of the first client computing device speaking, the audio analysis agent in the second client computing device displays the indicator based on the indicator command after the audio data has been received by the audio buffer in the second client computing device.

The audio analysis agent in the first client computing device may analyze the audio input from the user based on dividing the audio input into a plurality of overlapping windows, calculating signal energy of the audio input in each window, and comparing the calculated signal energy in each window to an audio threshold. When the calculated signal energy is below the audio threshold, then this represents user silence. When the calculated signal energy is above the audio threshold, this represents that the user is speaking.

The first and second client computing devices may be each configured to launch a collaboration app for the users to participate in a collaboration session, with the communications session operating within in the collaboration session.

The collaboration app may be accessed via a virtual computing session, and wherein the indicator is configured as a plug-in to the collaboration app.

Another aspect is directed to a client computing device as described above. The client computing device includes a display, and a processor is coupled to the display. The processor is configured to access a communications network to establish a communications session with at least one other client computing device. The processor is also configured to execute an audio analysis agent to determine network latency within the communications session based on communications with an audio analysis agent in the at least one other client computing device.

In response to the network latency exceeding a latency threshold, audio input from a user of the client computing device is analyzed by the processor to determine a speaking status of the user. The processor generates an indicator command message for the at least one other client comput-
ing device based on the determined speaking status of the
user. The indicator command message causes display of an
indicator by the at least one other client computing device
indicating when a user of the at least one other client
computing device can speak to avoid speech confliction with
the user of the client computing device.

Yet another aspect is directed to a method for operating
one of the client computing devices as described above. The
method includes operating the client computing device to
access a communications network to establish a communi-
cations session with at least one other client computing
device. An audio analysis agent within the client computing
device is executed to determine network latency within the
communications session based on communications with an
audio analysis agent in the at least one other client comput-
ing device. In response to the network latency exceeding a
latency threshold, audio input from a user of the client
computing device is analyzed to determine a speaking status
of the user. An indicator command message is generated for
the at least one other client computing device based on the
determined speaking status of the user. The indicator com-
mand message causes display of an indicator by the at least
one other client computing device indicating when a user of
the at least one other client computing device can speak to
avoid speech confliction with the user of the client comput-
ing device.

DETAILED DESCRIPTION

The present description is made with reference to the
accompanying drawings, in which exemplary embodiments
are shown. However, many different embodiments may be
used, and thus the description should not be construed as
limited to the particular embodiments set forth herein.

Rather, these embodiments are provided so that this disclo-
sure will be thorough and complete. Like numbers refer to
like elements throughout, and prime notation is used to
indicate similar elements in different embodiments.

Figure 1:
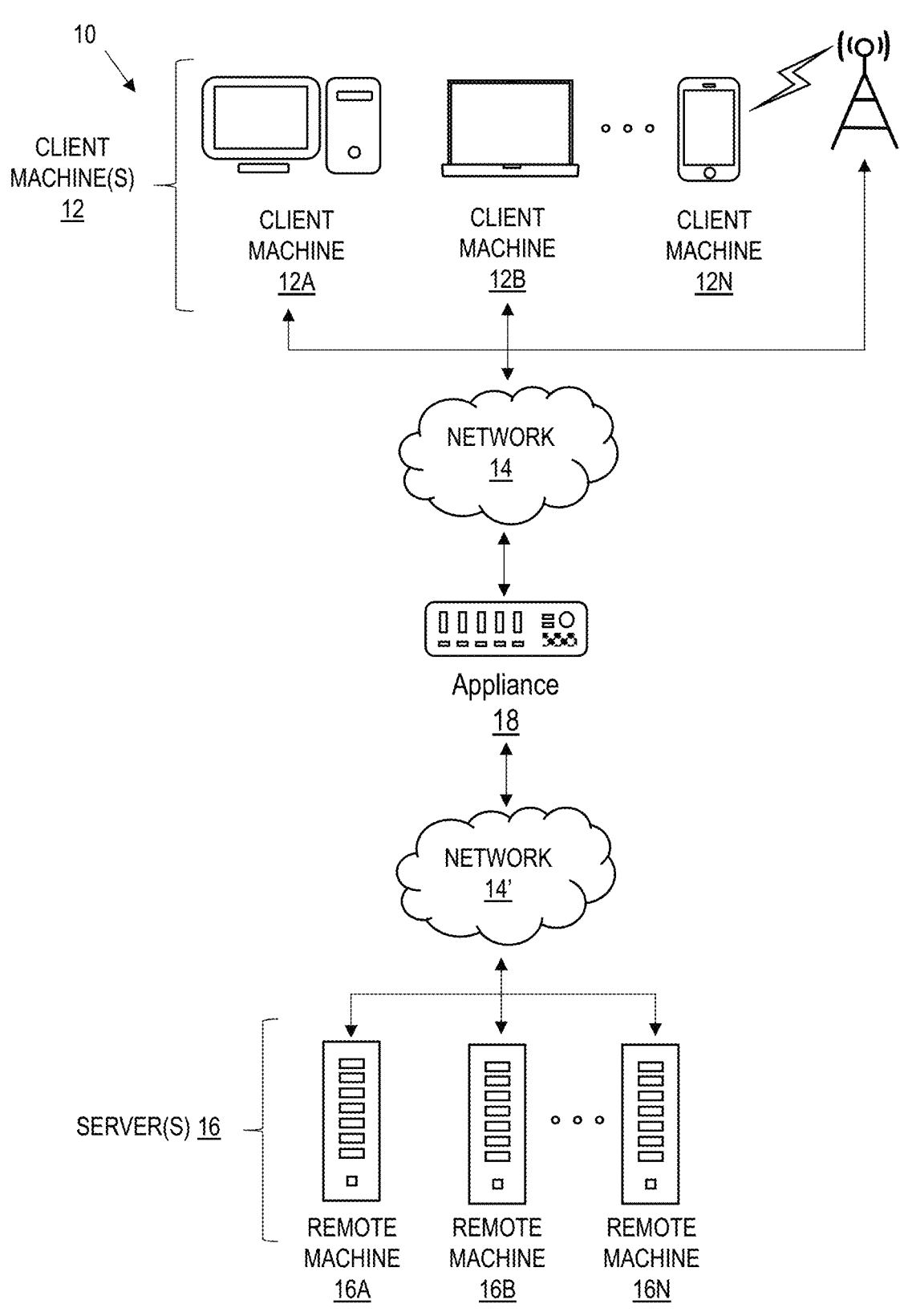
FIG. 1 is a schematic block diagram of a network envi-
ronment of computing devices in which various aspects of
the disclosure may be implemented.

Referring initially to FIG. 1, a non-limiting network
environment 10 in which various aspects of the disclosure
may be implemented includes one or more client machines
12A-12N, one or more remote machines 16A-16N, one or
more networks 14, 14', and one or more appliances 18
installed within the computing environment 10. The client
machines 12A-12N communicate with the remote machines
16A-16N via the networks 14, 14'. In some embodiments,
the client machines 12A-12N communicate with the remote
machines 16A-16N via an intermediary appliance 18. The
illustrated appliance 18 is positioned between the networks
14, 14' and may also be referred to as a network interface or
gateway. In some embodiments, the appliance 18 may
operate as an application delivery controller (ADC) to
provide clients with access to business applications and
other data deployed in a data center, the cloud, or delivered
as Software as a Service (SaaS) across a range of client
devices, and/or provide other functionality such as load
balancing, etc. In some embodiments, multiple appliances
18 may be used, and the appliance(s) 18 may be deployed as
part of the network 14 and/or 14'.

The client machines 12A-12N may be generally referred
to as client machines 12, local machines 12, clients 12, client
nodes 12, client computers 12, client devices 12, computing
devices 12, endpoints 12, or endpoint nodes 12. The remote
machines 16A-16N may be generally referred to as servers
16 or a server farm 16. In some embodiments, a client device
12 may have the capacity to function as both a client node
seeking access to resources provided by a server 16 and as
a server 16 providing access to hosted resources for other
client devices 12A-12N. The networks 14, 14' may be
generally referred to as a network 14. The networks 14 may
be configured in any combination of wired and wireless
networks.

A server 16 may be any server type such as, for example:
a file server; an application server; a web server; a proxy
server; an appliance; a network appliance; a gateway; an
application gateway; a gateway server; a virtualization
server; a deployment server; a Secure Sockets Layer Virtual
Private Network (SSL VPN) server; a firewall; a web server;
a server executing an active directory; a cloud server; or a
server executing an application acceleration program that
provides firewall functionality, application functionality, or
load balancing functionality.

A server 16 may execute, operate or otherwise provide an
application that may be any one of the following: software;
a program; executable instructions; a virtual machine; a
hypervisor; a web browser; a web-based client; a client-
server application; a thin-client computing client; an
ActiveX control; a Java applet; software related to voice
over internet protocol (VoIP) communications like a soft IP
telephone; an application for streaming video and/or audio;
an application for facilitating real-time-data communica-
tions; a HTTP client; a FTP client; an Oscar client; a Telnet
client; or any other set of executable instructions.

In some embodiments, a server 16 may execute a remote
presentation services program or other program that uses a
thin-client or a remote-display protocol to capture display
output generated by an application executing on a server 16
and transmit the application display output to a client device
12.

In yet other embodiments, a server 16 may execute a
virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
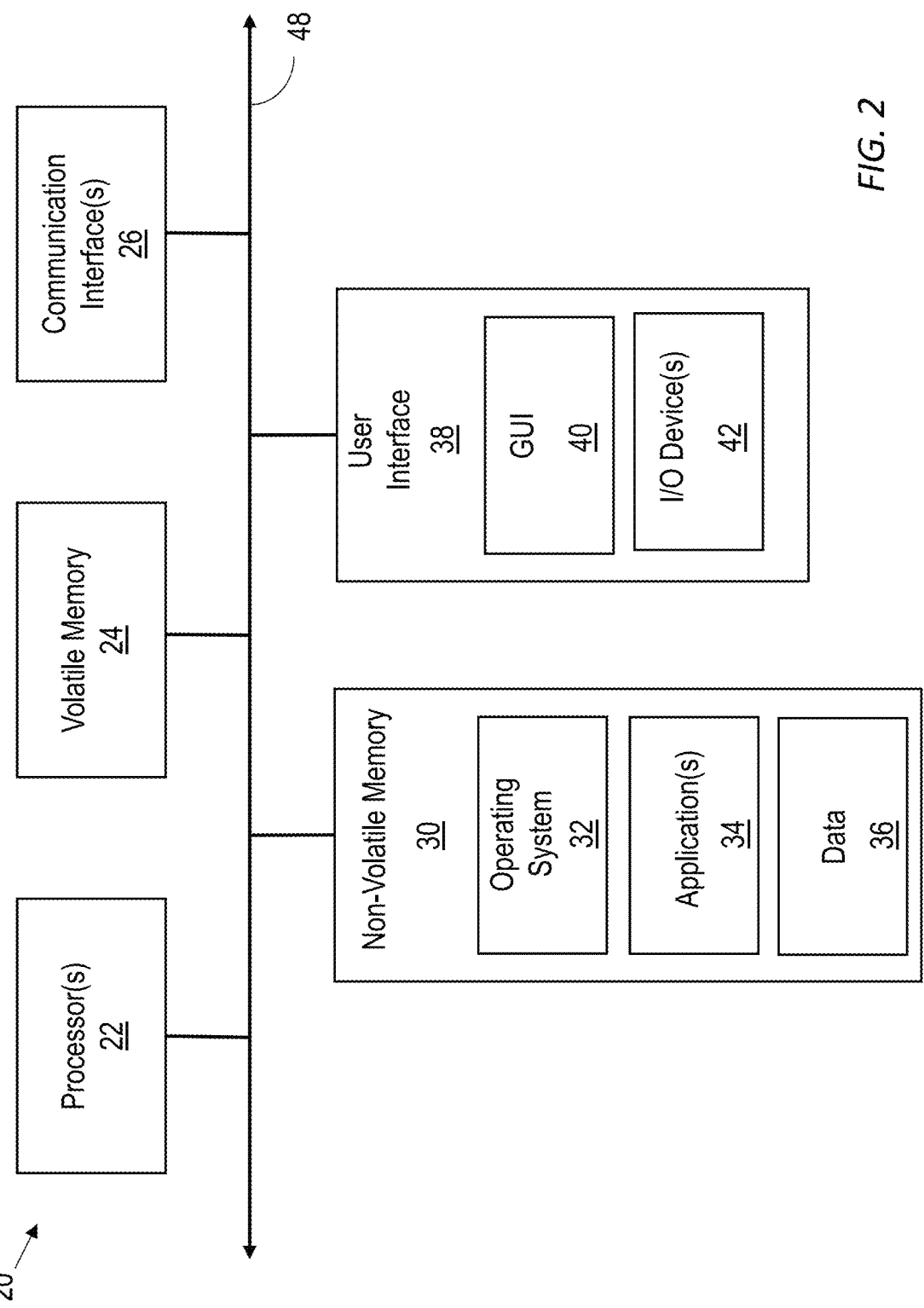
FIG. 2 is a schematic block diagram of a computing
device useful for practicing an embodiment of the client
machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
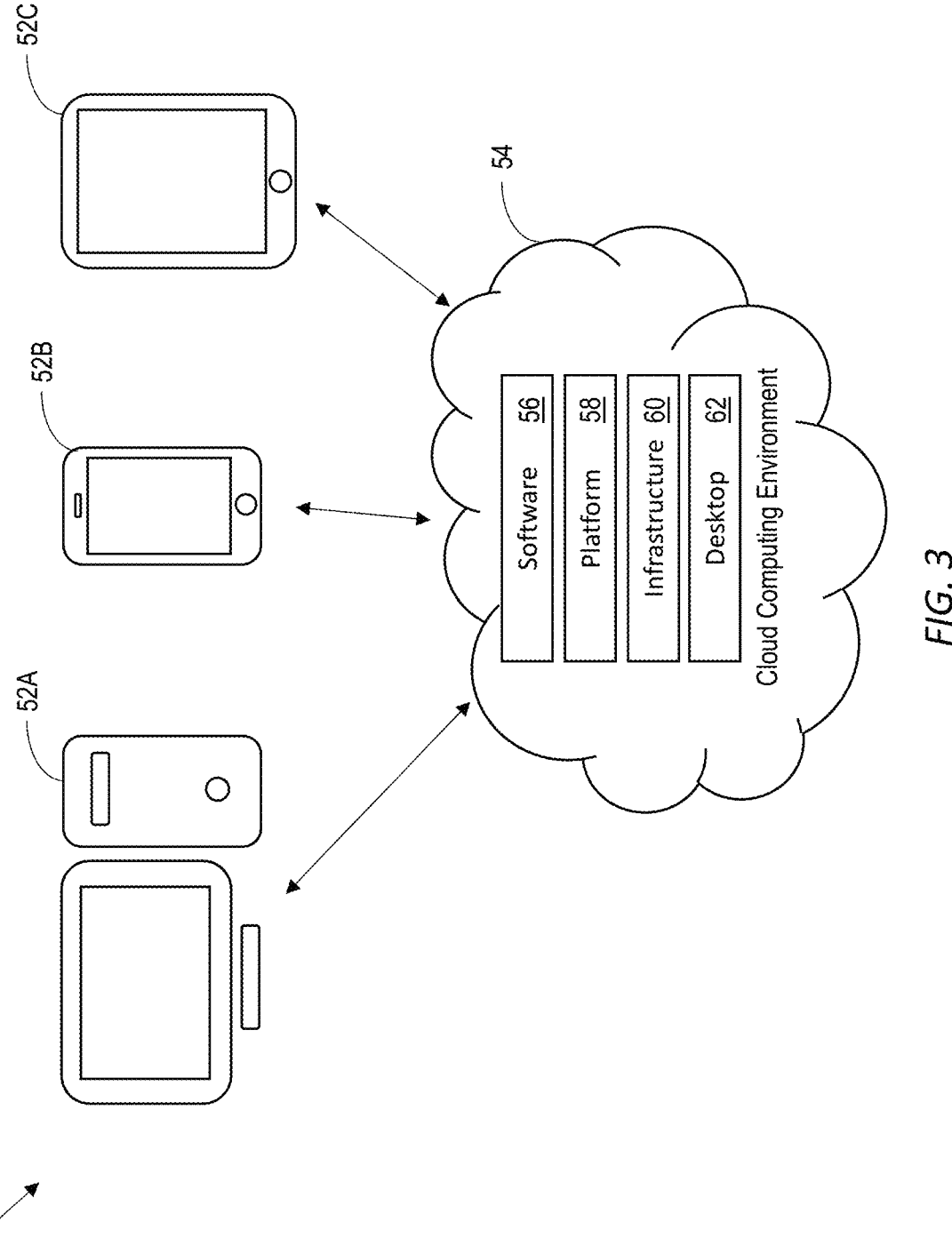
FIG. 3 is a schematic block diagram of a cloud computing
environment in which various aspects of the disclosure may
be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTS-CALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONE-DRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
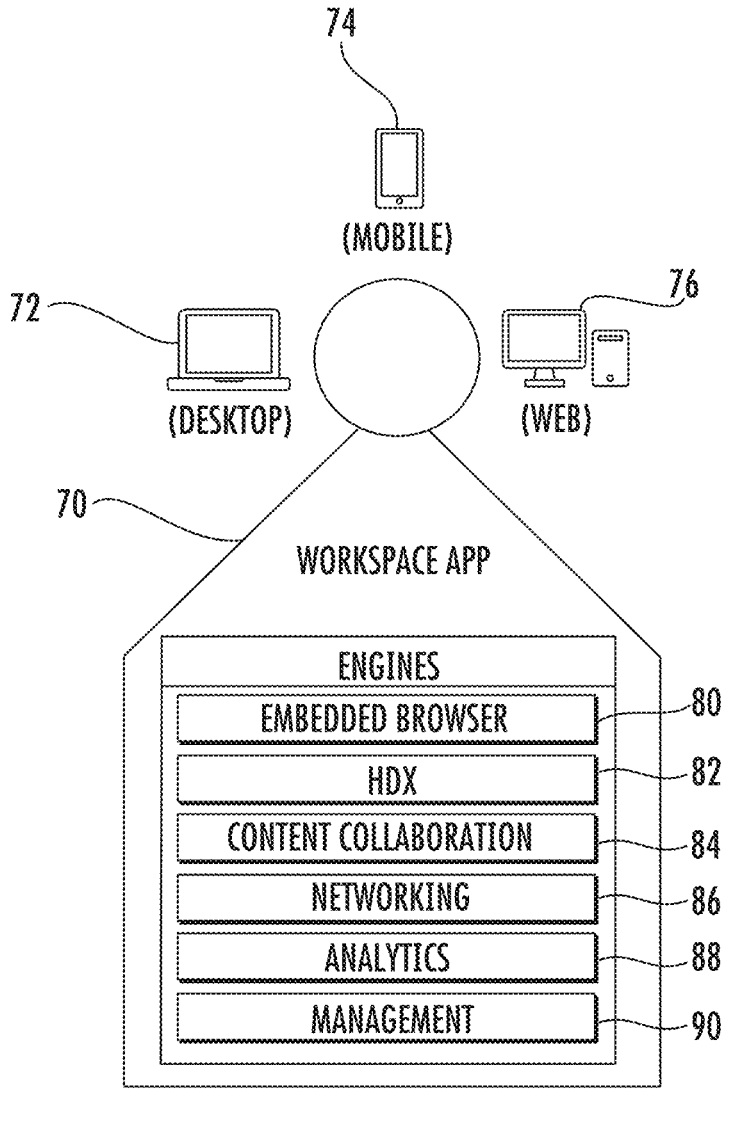
FIG. 4 is a schematic block diagram of desktop, mobile
and web based devices operating a workspace app in which
various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
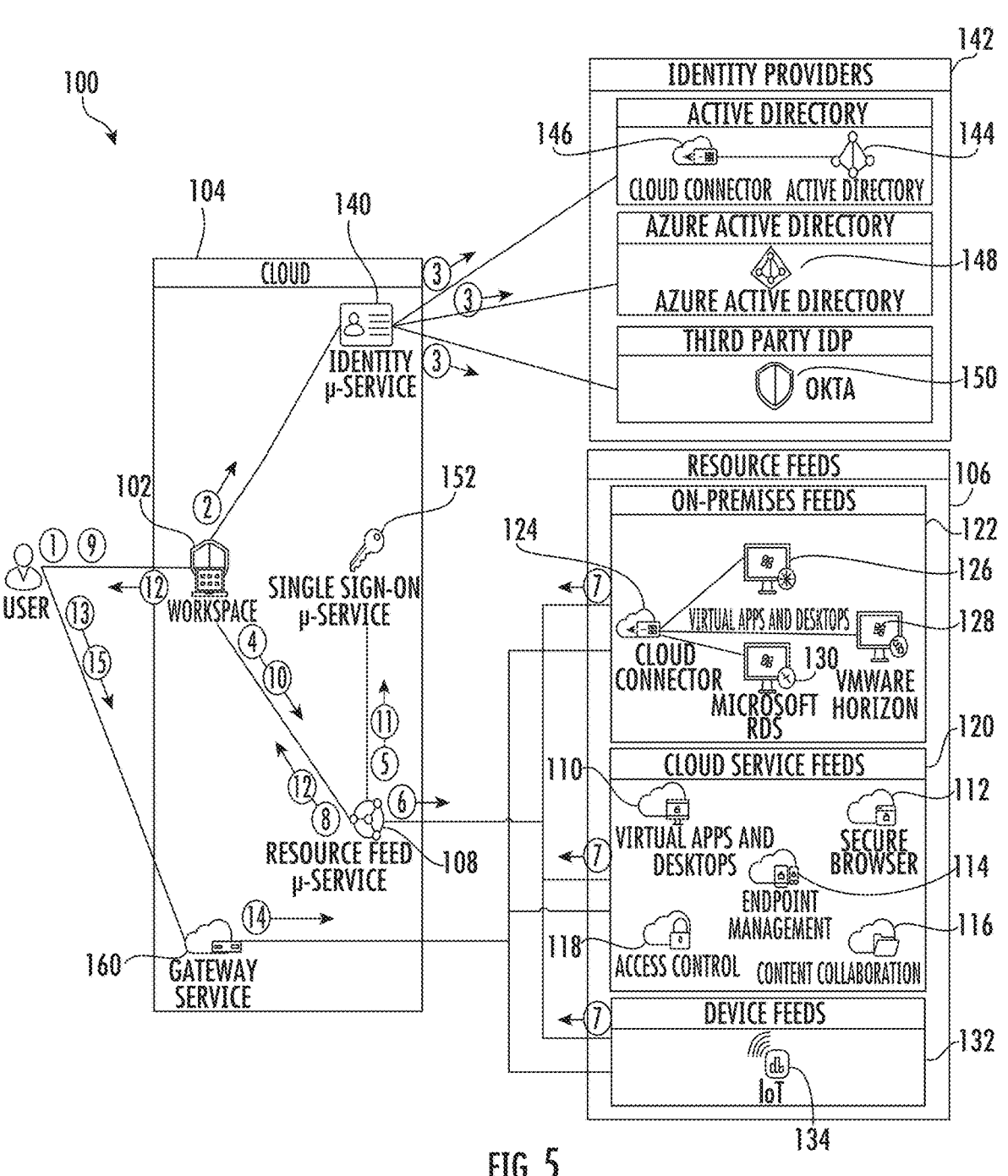
FIG. 5 is a schematic block diagram of a workspace
network environment of computing devices in which various
aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event Having an entire workspace delivered through a single access point or application advantageously improves productivity and streamlines common workflows for the user.

Another aspect of the disclosure is directed to avoiding speech confliction in a communications session when network latency is high. The communications session may be within a collaboration session, for example.

In a collaboration session, screen sharing and video conferencing is provided in real-time to users participating in the collaboration session. Example collaboration services providing the collaboration session include Microsoft (MS) Teams as provided by Microsoft, Webex as provided by Cisco, and GoToMeeting as provided by LogMeIn.

Current collaboration services do not compensate for high latency networks. High latency networks have a negative effect on user experience. In a high latency network, users participating within the communications session will typically experience people speaking at the same time or waiting for longer than necessary to ensure all speech has made it through. When people are speaking at the same time, speech confliction happens, which can create awkward situations. For example, both sides start talking at the same time, and then stop at the same time in response to the speech confliction, and again start talking at the same time.

As will be discussed in greater detail below, in response to determining that the network latency is high, a speaking status of a user is determined based on analyzing audio input of the user. In response to the determined speaking status of the user, an indicator command is sent to the other users listening to the speaker. The indicator command causes an indicator to be displayed to each of the users listening to the speaker. The indicator advantageously lets the users listening to the speaker know when to speak in order to avoid speech confliction with the speaker.

Figure 6:
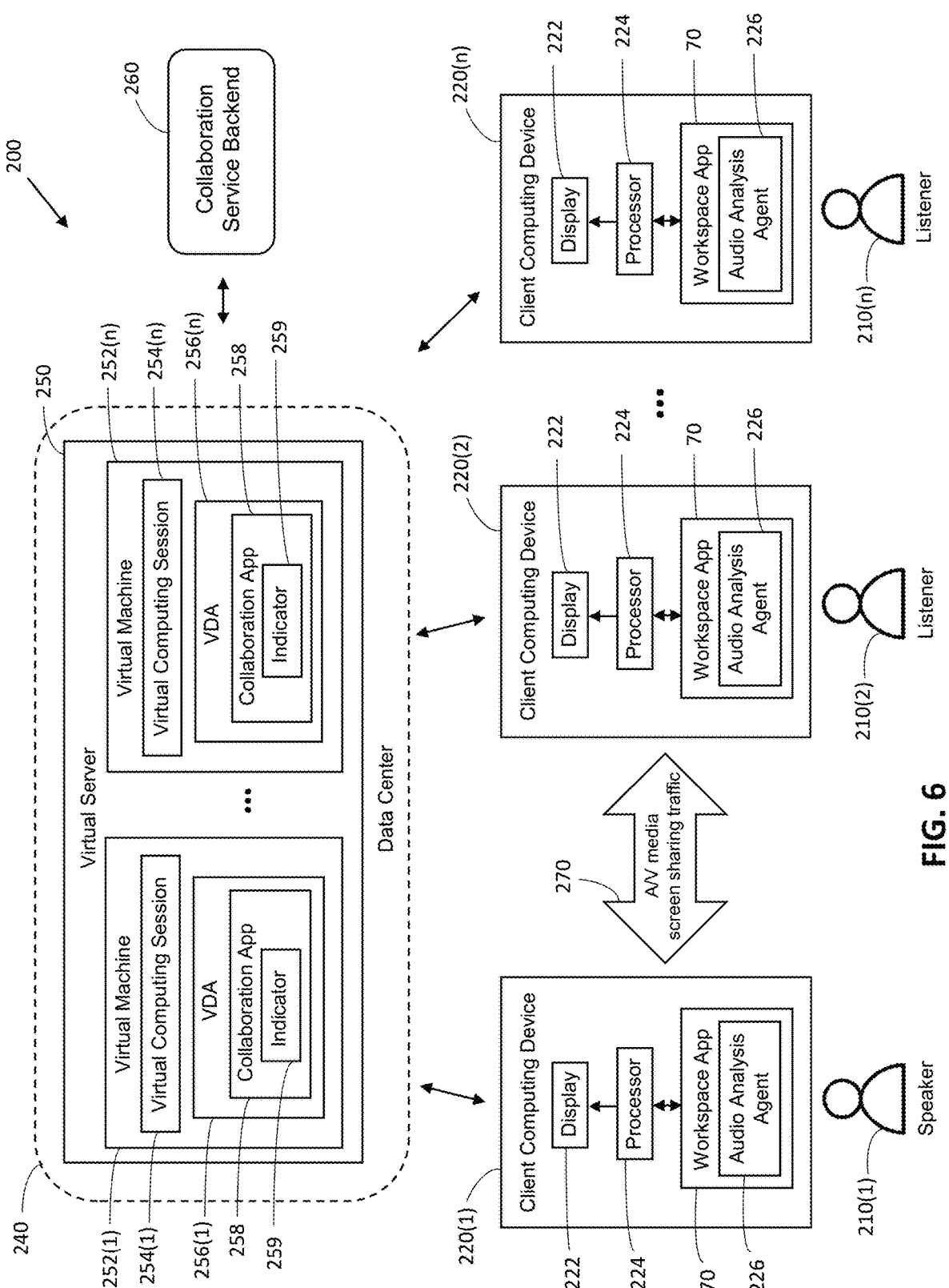
FIG. 6 is a schematic block diagram of a computing
system that provides an indicator for avoiding speech con-
fliction in a communications session when network latency
is high according to aspects of the disclosure.

Referring now to FIG. 6, a computing system 200 configured to avoid speech confliction in a communications session when network latency is high will be discussed. The communications session may be a collaboration session where the users 210(1)-**210(*n*) are part of an organization or enterprise. A collaboration service backend 260 interfacing with a data center 240 allows the users 210(1)-210(*n*), which may be generally referred to as users 210**, to participate in the collaboration session.

Collaboration sessions provide screen sharing and video conferencing 270 in real-time for the users 210. As noted above, example collaboration services provided by the collaboration service backend 260 include Microsoft (MS) Teams as provided by Microsoft, Webex as provided by Cisco, and GoToMeeting as provided by LogMeIn.

Within the collaboration session, one of the users 210(1) will be the initial speaker, while the other users 210(2)-**210(*n*) will be listeners. User 210(1) is typically the one that initiates the collaboration session with the other users 210(2)-210(*n*)**.

Each client computing device 220(1)-**220(*n*), which may be generally referred to as client computing device 220, includes a display 222, a processor 224 coupled to the display, and a workspace app 70 executed by the processor 224. As discussed above, the workspace app 70** is how a user gets access to their workspace resources within an organization, which includes applications and desktops, for example.

An audio analysis agent 226 is within the workspace app 70. The audio analysis agent 226 includes an input audio analysis agent and an output audio analysis agent. As will be explained in greater detail below, the audio analysis agent 226 first determines if the communications session is operating in a high latency network.

In response to the network latency exceeding a threshold, the audio analysis agent 226 analyzes audio input of the user 210(1) to determine a speaking status of the user 210(1). Based on the speaking status of the user 210(1), an indicator command is sent from the audio analysis agent 226 in client computing device 220(1) to the audio analysis agents 226 in the other client computing devices 220(2)-**220(*n*)**.

The indicator command is used by the respective audio analysis agents 226 in the other client computing devices 220(2)-**220(*n*) to trigger an indicator 259 that will be displayed to users 210(2)-210(*n*). Each indicator 259 will let the users 210(2)-210(*n*) know when they can speak so as to avoid speech confliction with user 210(1) currently speaking. The indicator 259 may be a plug-in to the collaboration app 258**.

Alternatively, the collaboration app 258 may be modified to include the function of the indicator 259.

The indicator 259 may be selected to display colors, text and/or graphics to indicate the speaking status of the user 210(1) of client computing device 220(1). The indicator 259 will not be displayed on client computing device 220(1) since the user 210(1) of this client computing device is the one speaking. However, if the user 210(1) of client computing device 220(1) is no longer the speaker within the communications session, then the indicator 259 will be displayed on client computing device 220(1). This means that one of the other users 210(2)-**210(*n*) is now the speaker and is controlling the indicator 259 associated with the other client computing devices. This may occur, for example, when one of the other users 210(2)-210(*n*)** takes control of the screen within the collaboration session.

Referring now to FIGS. 7-10, an indicator 259 configured to display different colors to represent the speaking status of the user 210(1) will be discussed. The illustrated screenshots are form a perspective of the user 210(4) of client computing device 220(4). The screenshots correspond to a discussion screen being displayed within the communications session. As noted above, the communications session may be part of an online collaboration session where screen sharing and video conferencing is provided in real-time to the users participating in the collaboration session.

Figure 7:
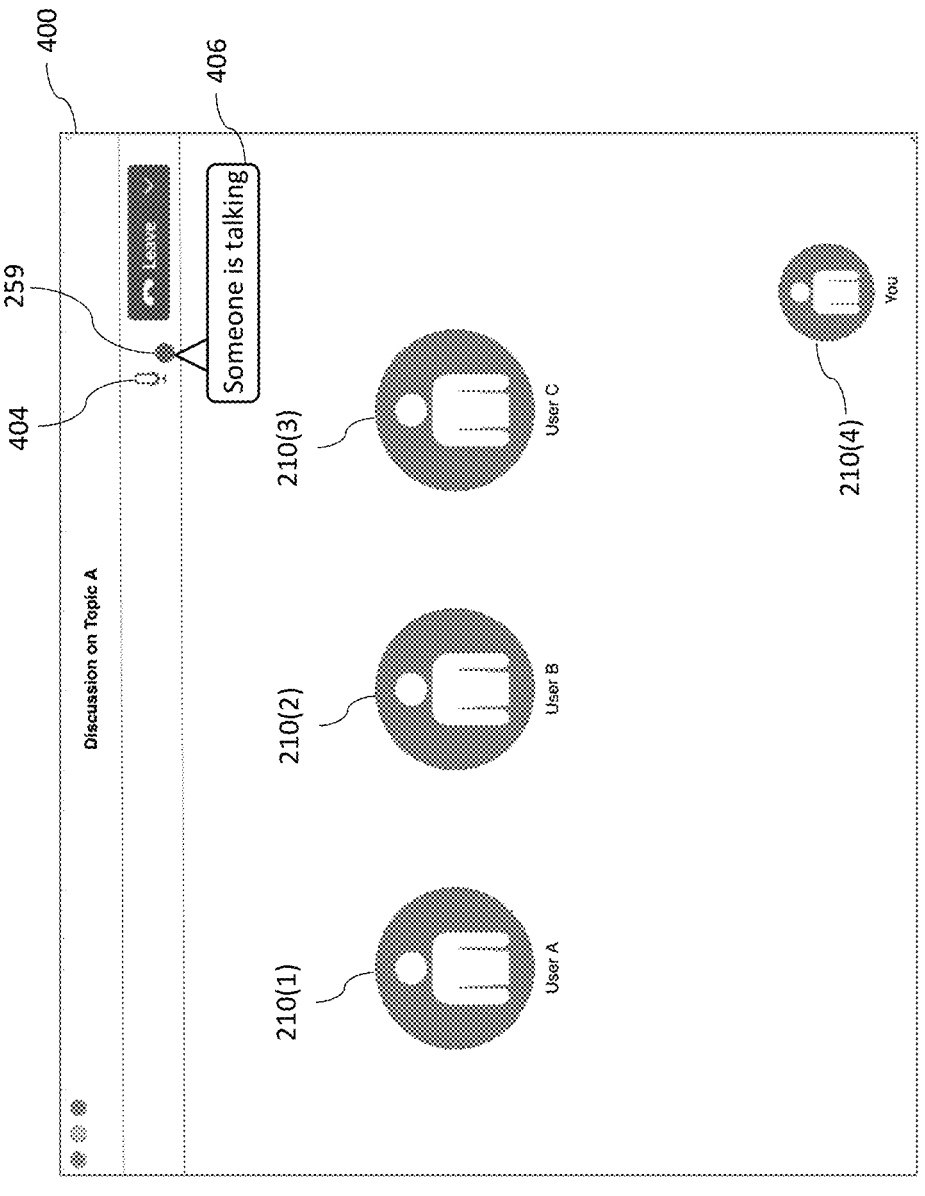
FIGS. 7-10 are screen shots within a communications
session illustrating operation of the indicator in FIG. 6.
Figure 8:
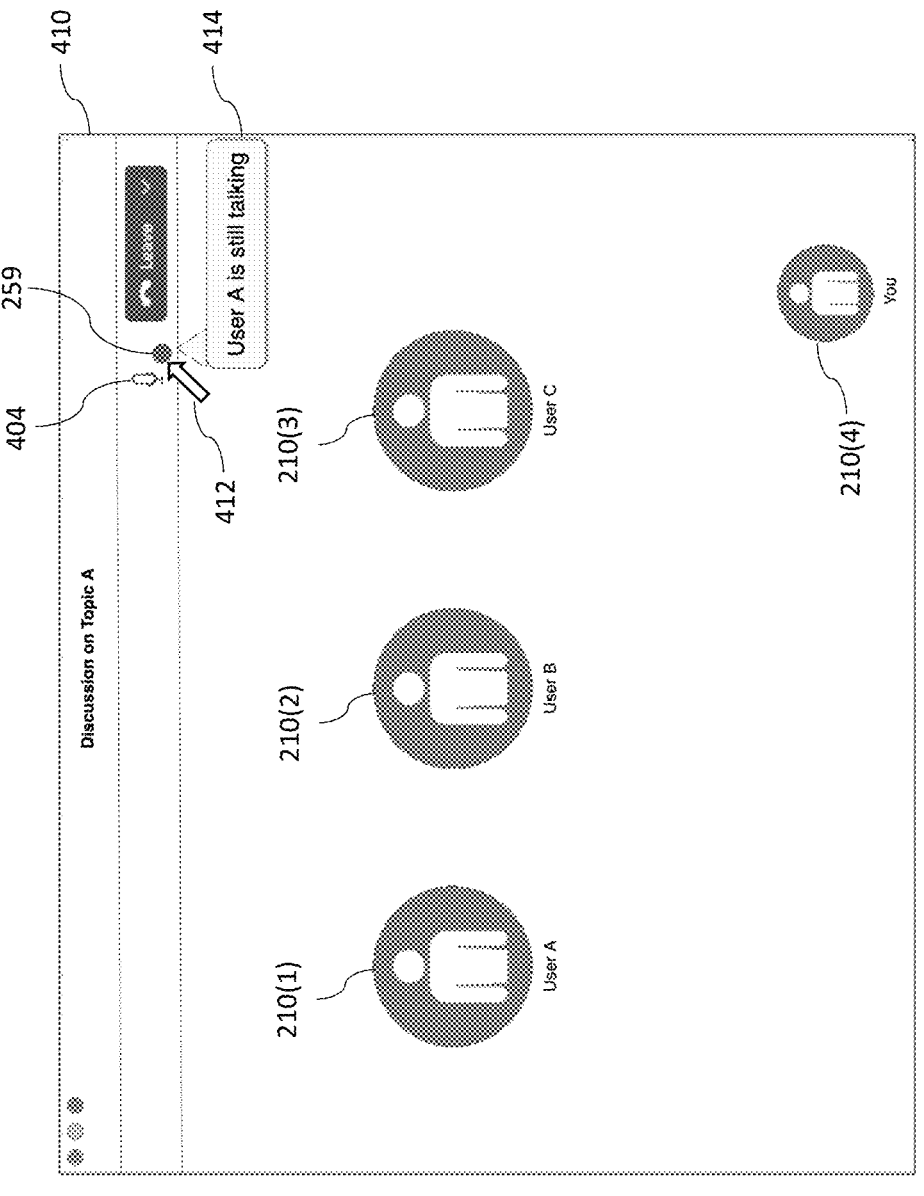
Figure 9:
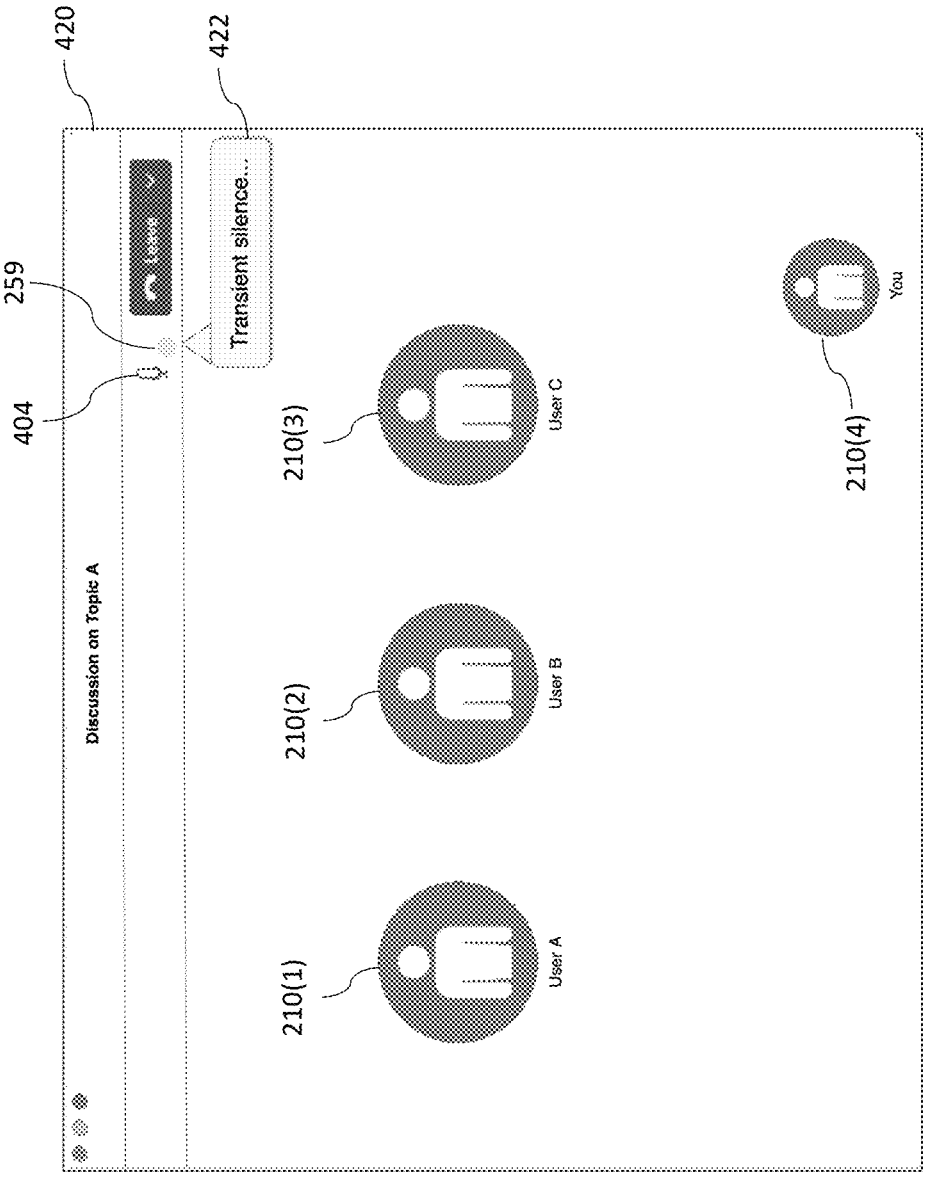
Figure 10:
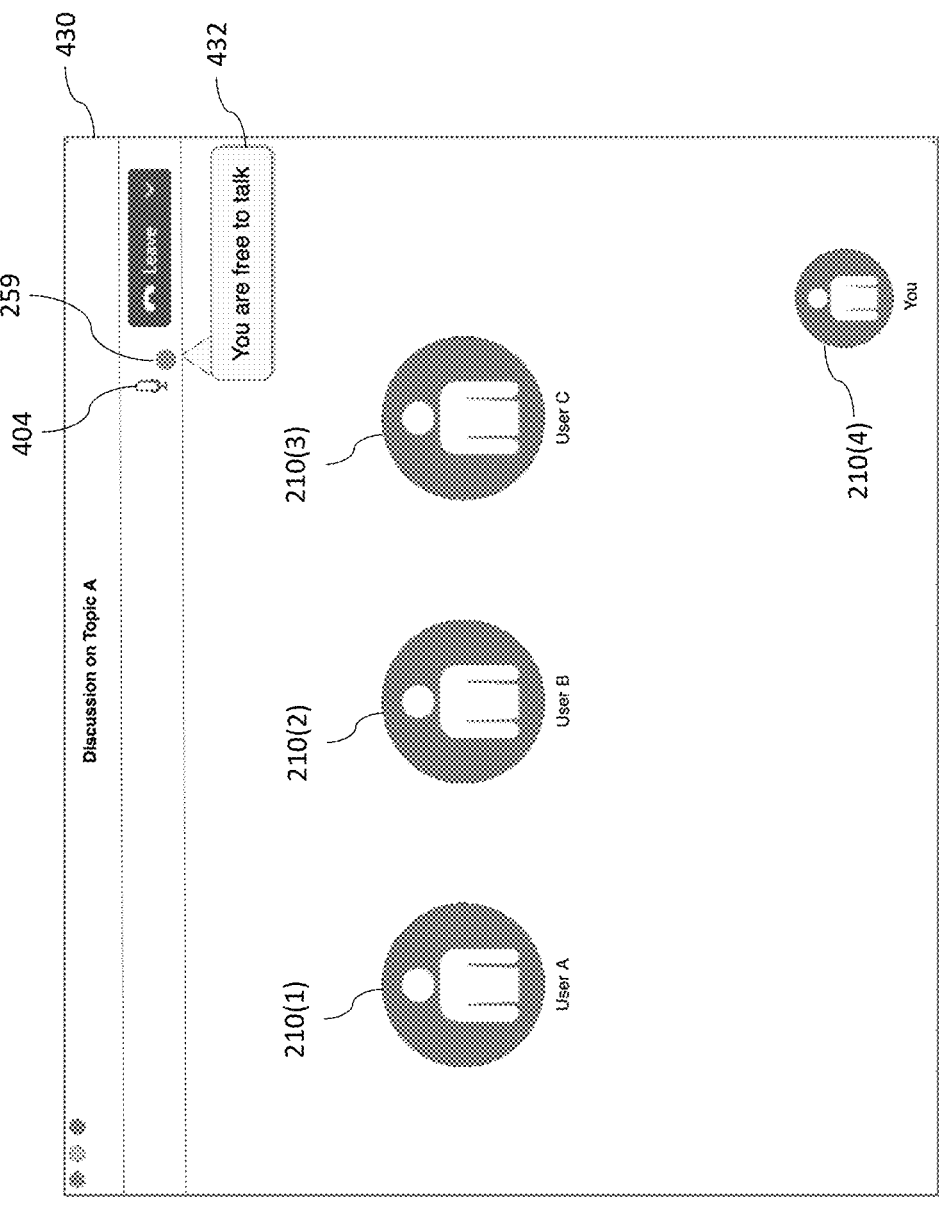

In screenshot 400, as shown in FIG. 7, the indicator 259 is positioned next to a microphone icon 404. The users 210(1)-210(3) of client computing devices 220(1)-220(3) participating within the communications session are displayed, as well as the user 210(4) of client computing device 220(4). Display of the users 210(1)-210(4) may be by video and/or by name, for example.

In response to someone talking, the color of the indicator 259 is red. This indicates to user 210(4) that one of users 210(1)-210(3) is speaking. A display banner 406 "Someone is speaking" is for illustration purposes, and will typically not be shown to user 210(4) in this embodiment. If user 210(4) wants to know who is speaking, then a cursor 412 may be placed over the indicator 259, as shown in screenshot 410 in FIG. 8. This causes the identity of the speaker to be displayed at banner 414, which is user A 210(1).

The other colors of the indicator 259 are based on a length of a pause in user A 210(1) speaking. As will be discussed below, if the pause reaches 50 milliseconds, for example, than the color of the indicator 259 is yellow, as shown in screenshot 420 in FIG. 9. The display banner 422 "Transient silence . . . " is for illustration purposes, and will typically not be shown to user 210(4) in this embodiment. If the pause continues past 2 seconds, for example, then the color of the indicator 259 is green, as shown in screenshot 430 in FIG. 10. The display banner 432 "You are free to talk" is for illustration purposes, and will typically not be shown to user 210(4) in this embodiment. As soon as user 210(1) starts to speak again after the pause, then the color of the indicator 259 is immediately changed back to red.

Still referring to FIG. 6, the computing system 200 includes a virtual server 250 operating within the data center 240. The virtual server 250 includes virtual machines 252 (1)-252(*n*) providing virtual computing sessions 254(1)-254 (*n*) to be accessed by the client computing devices 220(1)-220(*n*) via a communications network. The virtual machines 252(1)-252(*n*) may be generally referred to as virtual machines 252, and the virtual computing sessions 254(1)-254(*n*) may be generally referred to as virtual computing sessions 254.

Virtual delivery appliances (VDAs) 256(1)-256(*n*) are associated with the virtual machines 252(1)-252(*n*). The virtual delivery appliances 256(1)-256(*n*) may be generally referred to as virtual delivery appliances 256. Each client device 220 will have a virtual machine 252 and a corresponding virtual delivery appliance 256 assigned thereto.

The virtual delivery appliances 256 are software installed on the virtual machines 252 running in the virtual server 250. The virtual machines 252 provide the virtual computing sessions 254, and the virtual delivery appliances 256 make the virtual computing session 254 remotely available to a client computing device 220. The virtual delivery appliances 256 may be a Citrix Virtual Delivery Agent (VDA), for example. Each virtual delivery appliance 256 is configured to provide the collaboration app 258 that allows a user 210 to participate in an online collaboration session with other users 210 within the organization.

The collaboration app 258 may be referred to as a centralized collaboration app. When the centralized collaboration app 258 is launched by the user 210, the collaboration app 258 is running within the data enter 240 in a remote session, i.e., a virtual computing session 254. Authentication of the user 210 launching the collaboration app 258 is between the remote session and the collaboration service backend 260. In other embodiments, the collaboration app 258 may be a localized collaboration app launched locally on the client computing device 220.

Figure 11:
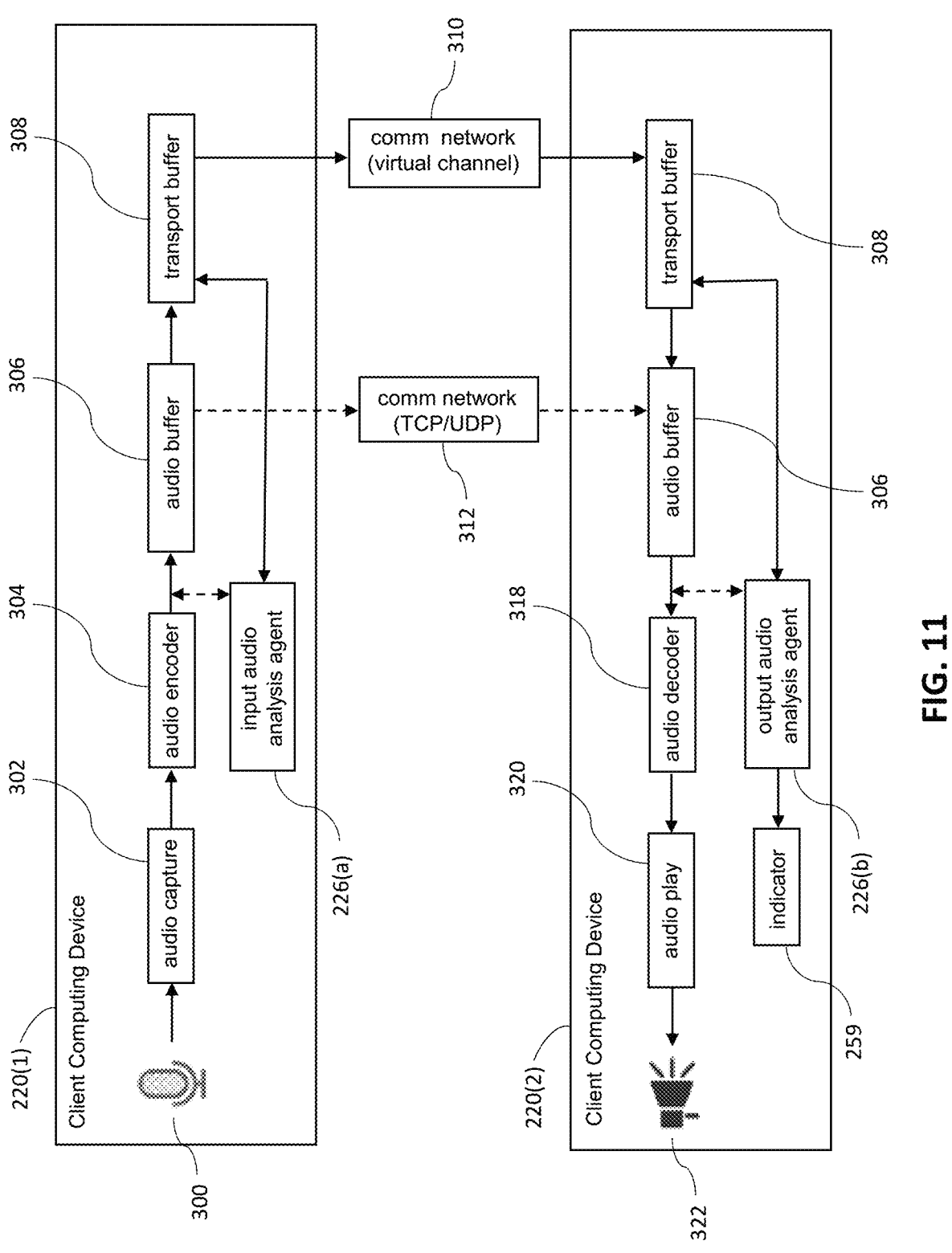
FIG. 11 is a schematic block diagram of two of the client
computing devices in FIG. 6 illustrating audio paths within
different communications network types.

Referring now to FIG. 11, two different audio paths for the client computing devices 220 will be discussed, where each audio path has a respective latency associated therewith. For illustration purposes, the audio paths are illustrated between client computing device 220(1) and client computing device 220(2).

One of the audio paths goes through communications network 310 supporting the virtual computing sessions 254. The communications network 310 includes virtual channels between the client computing devices 220 and the virtual server 250. As an example, the virtual channel may be an independent computing architecture (ICA) virtual channel as provided by Citrix Systems. The ICA channel is a bidirectional connection for the exchange of generalized packet data.

The other audio path goes through communications network 312, which is based on a general connection using different types of internet protocols (IP). One internet protocol type is a transmission control protocol (TCP) which is connection oriented. Once a connection is established, data can be sent bidirectional. The other internet protocol type is a user datagram protocol (UDP). UDP is a connectionless protocol where multiple messages are sent as packets.

In client computing device 220(1), user 210(1) is the initiator of the collaboration session and speaks into microphone 300. The audio from the microphone 300 is passed to an audio capture 302 which is then encoded in an audio encoder 304. The encoded audio is passed to an audio buffer 306. If communications network 310 is being used, then the audio buffer 306 provides the audio to transport buffer 308. The audio is sent across communications network 310 and is received by transport buffer 308 in client computing device 220(2).

Alternatively, if communications network 312 is being used, then the audio is sent across communications network 310 and is received by audio buffer 306 in client computing device 220(2). Regardless of the communications network 310, 312 used, the received audio is decoded in an audio decoder 318. The decoded audio then then provided to an audio play 320 to be heard by user 210(2) via a speaker 322.

The audio analysis agent 226 is used to monitor when a noticeable latency is present within the communications network 310, 312 being used. In response to the communications network 310, 312 having a high latency, the audio analysis agent 226 analyzes the audio input of user 210(1) to determine a speaking status. Based on the determined speaking status, the audio analysis agent 226 then determines a color of the indicator 259 that is to be displayed to users 210(2)-210(*n*). The color of the indicator 259 lets users 210(2)-210(*n*) know when they can speak so as to avoid speech confliction with user 210(1).

As noted above, the audio analysis agent 226 includes an input audio analysis agent 226(*a*) and an output audio analysis agent 226(*b*). For illustration purposes, just the input audio analysis agent 226(*a*) is illustrated in client computing device 220(1) since user 210(1) is speaking. Similarly, just the output audio analysis agent 226(*b*) is illustrated in client computing device 220(2) since user 210(2) is listening to user 210(1).

In response to the collaboration session beginning with 2 or more attendees present, the audio analysis agent 226 determines the latency of the communications network 310, 312 being used. Latency is determined by the input audio analysis agent 226(*a*) sending a monitoring message to the output audio analysis agent 226(*b*). The monitoring message may also be referred to as a heartbeat signal.

The transmitted monitoring message includes a start timestamp. When the monitoring message with the start timestamp is received, the output audio analysis agent 226(*b*) assigns an end timestamp to the monitoring message.

The output audio analysis agent 226(*b*) determines a time gap or time difference between the start timestamp and the end timestamp of the monitoring message. This time gap is provided back to the input audio analysis agent 226(*a*) and is used to determine latency.

A baseline network delay of 50 milliseconds, for example, may be classified as normal. However, if the time gap exceeds 300 milliseconds, for example, then the network is classified as having a high latency. The 300 milliseconds time gap is a predetermined latency threshold corresponding to a high latency. The value of the predetermined latency threshold may be a default value. Alternatively, the predetermined latency threshold may be chosen by the users 210(1)-210(*n*) for a customized value which differs from person to person.

In addition to client computing device 220(2) receiving the monitoring message, each of the other client computing devices 220(3)-220(*n*) participating in the collaboration session will receive the monitoring message as well. In other words, the monitoring message is broadcast by client computing device 220(1) to all of the client computing devices 220(2)-**220(*n*)** participating in the collaboration session.

If any of the client computing devices 220(2)-**220(*n*) is experiencing a latency issue, then the function of the indicator 259 will be enabled for all of these devices. Even if one of the client computing devices 220 is not experiencing a high latency, the client computing device having the worst latency sets an overall latency for each of the other client computing devices operating in the computing system 200. That is, even if one of the client computing devices 220(2)-220(*n*) is not experiencing high latency, then the corresponding indicator 259 is still enabled to display a speaking status of user 210(1)**.

The network latency is periodically determined, and in response to the network latency remaining above the latency threshold, then the indicator 259 remains enabled for each of client computing devices 220(2)-**220(*n*). Alternatively, if the network latency is low for each of the client computing devices 220(2)-220(*n*), then the function of the indicator 259** is disabled for these devices.

If the network latency is determined to be high, then the input audio analysis agent **226(*a*) recognizes audio input from user 210(1) from other audio sources that may be present. Other audio sources may include people talking in the background, as picked up by microphone 300**.

The input audio analysis agent **226(*a*) is configured to send an indicator command message to the output audio analysis agent 226(*b*). The indicator command message includes a size of the audio in the audio buffer 306 that has not yet been sent, and the indicator command. As discussed above, the indictor command causes the indicator 259** to display red, yellow or green, for example.

The communications network 310, 312 may only allow 10 bytes of audio to be sent, for example. This means if 100 bytes of audio is to be sent, then the audio beyond the 10 bytes is placed in the audio buffer 306. The amount of audio data in the audio buffer 306 is taken into account when sending the indicator command.

The indicator command message is sent as a high priority message as compared to other messages being sent by the client computing device 220(1). The output audio analysis agent **226(*b*) in client computing device 220(2)** will act according to the received indicator command message.

The input audio analysis agent **226(*a*) is also configured to recognize the user's audio input from the overall audio that is received by the microphone 300**. Signal energy may be used as an indicator to recognize the user's audio input.

As part of the analysis, noise cancellation and echo cancellation may be performed. Noise cancellation may be needed when user 210(1) is in a noisy environment which includes many other sounds that are not made by user 210(1). Echo cancellation may be needed when user 210(1) is speaking in a small, closed space where an echo of the user's own voice can be heard.

Voice activity detection (VAD) may be used to indicate speech activity. Windowing is first applied to the audio input signal with 30 millisecond windows and with a 50% overlap, for example. For each window, the signal energy is calculated using the following equation:

$$\sigma^2(x) := \|x\|^2 = \sum_{k=0}^{N-1} x_k^2.$$

$\sigma2(x)$ is the energy of the input signal, x is input signal data, and

N is time duration in milliseconds.

Second, a threshold $\theta_{SILENCE}$ (default 17 dB) is set, such that the energy of the signal $\sigma2(x)$ in comparison to the threshold is used to determine speech activity:

$$VAD(x) := \begin{cases} 0, & \sigma^2(x) < \theta_{SILENCE} \\ 1, & \sigma^2(x) \geq \theta_{SILENCE} \end{cases}.$$

VDA(x) is a result on if the user is speaking: 0 not speaking, 1 speaking, $\sigma2(x)$ is the energy of the input signal, and $\theta_{SILENCE}$ is the threshold value to determine if the energy of the input signal is interpreted as speaking or not speaking.

Figure 12:
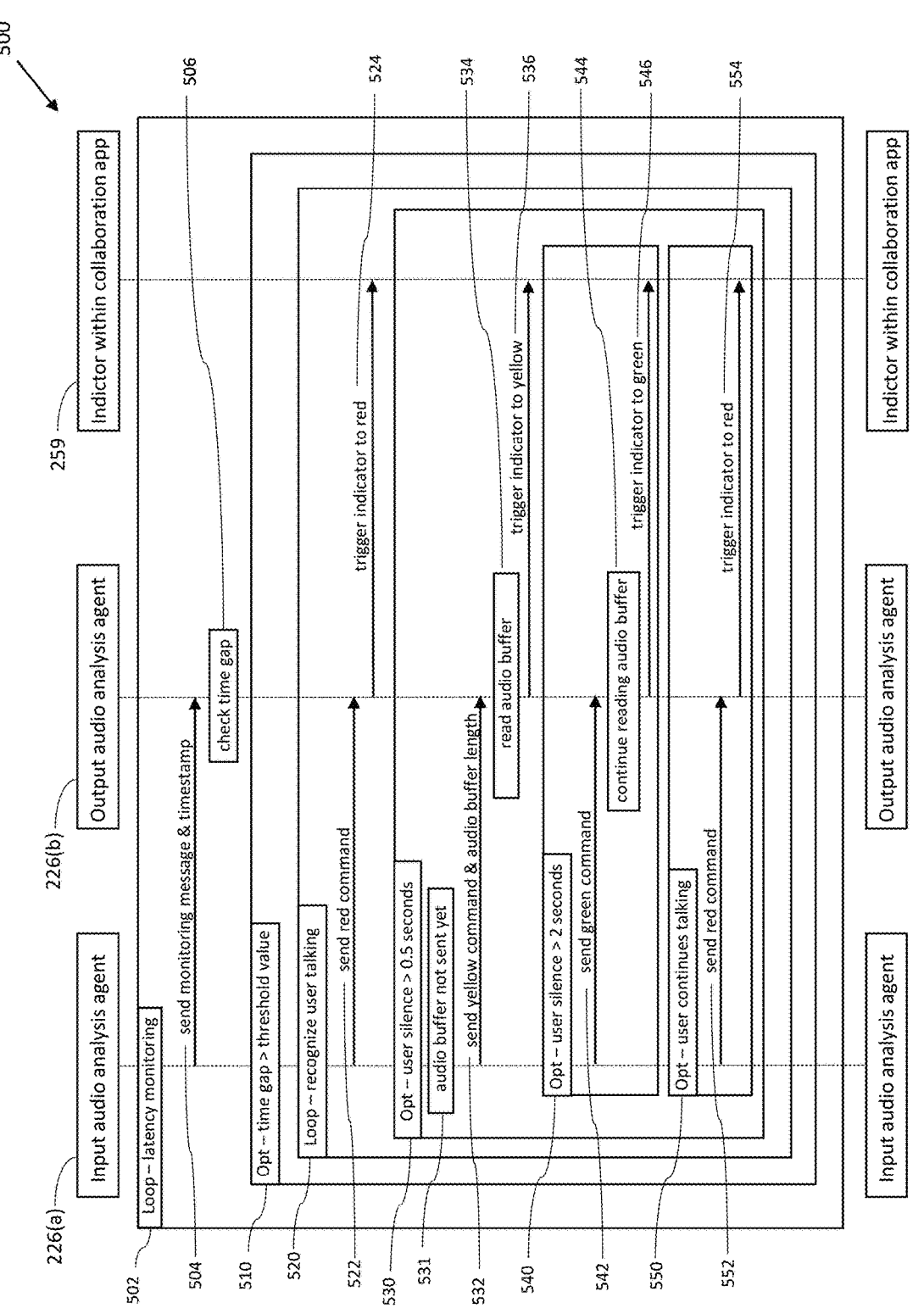
FIG. 12 is a sequence flow diagram between the input
audio analysis agent, the output audio analysis agent and the
indicator for the client computing devices in FIG. 6.

A sequence flow diagram 500 between the input audio analysis agent **226(*a*), the output audio analysis agent 226(*b*) and the indicator 259 will now be discussed in reference to FIG. 12**.

The sequence flow diagram 500 is divided into blocks. Block 502 is for periodically monitoring latency of the communications network. At line 504, the input audio analysis agent **226(*a*) transmits a monitoring message that includes a start timestamp to the output audio analysis agent 226(*b*). When the monitoring message with the start timestamp is received, the output audio analysis agent 226(*b*) assigns an end timestamp to the monitoring message. The output audio analysis agent 226(*b*) determines a time gap or time difference in box 506 between the start timestamp and the end timestamp of the monitoring message. This time gap is provided back to the input audio analysis agent 226(*a*)** and is used to determine latency.

In response to the time gap exceeding the latency threshold value, the sequence flow diagram 500 sequences to Block 510. Within Block 510, Block 520 is used to recognize that the user 210(1) is speaking. In response to the user 210(1) speaking, a red command is sent at line 522 from the input audio analysis agent **226(*a*) to the output audio analysis agent 226(*b*). The output audio analysis agent 226(*b*) then triggers the indicator 259 at line 524 to have a red color indicating that the user 210(1)** is speaking.

In response to there being a pause or gap in the user 210(1) speaking, Block 530 is implemented. If the pause reaches a first threshold, such as 0.5 seconds, then box 531 indicates that the contents of the audio buffer 306 have not been sent yet.

A yellow command is sent at line 532 from the input audio analysis agent **226(*a*) to the output audio analysis agent 226(*b*). The output audio analysis agent 226(*b*) starts to read the contents of the audio buffer 306 at box 534 and then triggers the indicator 259 at line 536 to have a yellow color indicating that the user 210(1)** has momentarily stopped speaking.

Within Block 530, Block 540 is used to recognize that the user 210(1) has stopped talking for a second threshold that is greater than the first threshold, such as 2 second. In response to the same pause reaching the second threshold, then a green command is sent at line 542 from the input audio analysis agent **226(*a*) to the output audio analysis agent 226(*b*). The output audio analysis agent 226(*b*) finishes reading the contents of the audio buffer 306 at box 544 and then triggers the indicator 259 at line 546 to have a green color indicating that the user 210(1)** has stopped speaking.

Within Block 530, Block 550 is used to recognize that the user 210(1) has continued talking after the 0.5 second pause. In this case, a red command is sent at line 552 from the input audio analysis agent **226(*a*) to the output audio analysis agent 226(*b*). The output audio analysis agent 226(*b*) then immediately triggers the indicator 259 at line 554 to have a red color indicating that the user 210(1) is speaking. The output audio analysis agent 226(*b*) triggers the indicator 259 to have the red color regardless of the audio data in the audio buffer 306**.

Figure 13:
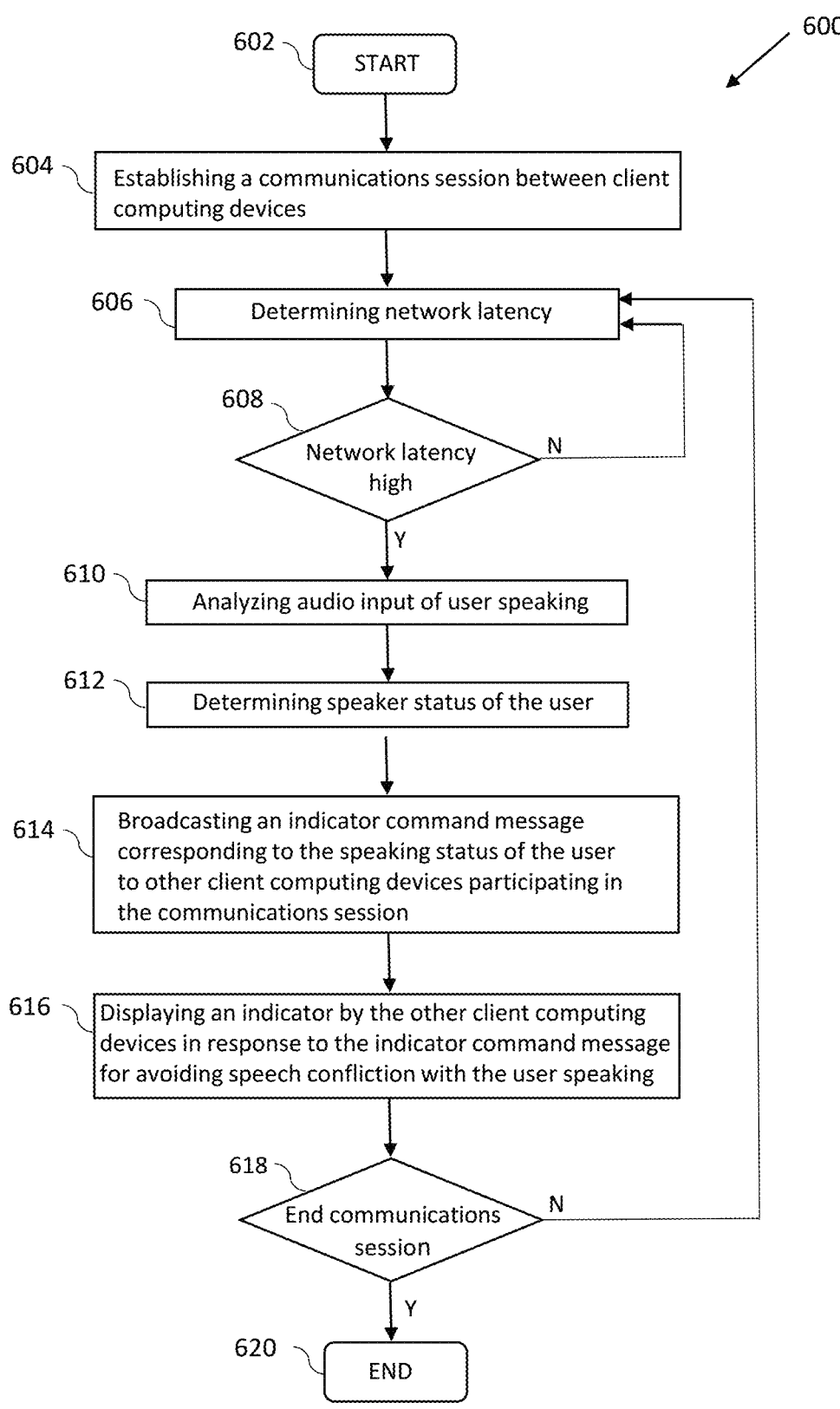
FIG. 13 is a flow diagram on operating the computing
system illustrated in FIG. 6.

Referring now to FIG. 13, a flow diagram 600 for operating the above described computing system 200 will be discussed. From the start (Block 602), a communications session is established in Block 604 between client computing device **220(1)-220(*n*)**.

Network latency is determined in Block 606. This is based on the input audio analysis agent **226(*a*) in client computing device 220(1) communicating with the audio analysis agents 226(*b*) in the other client computing devices 220(2)-220(*n*)**.

A determination is made in decision Block 608 on if the determined network latency is high. If the latency is low, then the method loops back to Block 606 to periodically determine the network latency. If the latency is high, then the method continues to Block 610 where the audio input from user 210(1) is analyzed.

The speaking status of the user is determined in Block 612 based on the analyzed audio input from the user speaking. An indicator command message is broadcast in Block 614 to the other client computing devices **220(2)-220(*n*)** participating in the communications session. The indicator command message corresponds to the speaking status of the user.

The other client computing devices **220(2)-220(*n*) receive the indicator command message from client computing device 220(1). In Block 616, the other client computing devices 220(2)-220(*n*) display an indicator 259 in response to the indicator command message. The indicator 259 indicates to users 210(2)-210(*n*) on when user 210(1)** is speaking in order to avoid speech confliction.

A determination is made in decision Block 618 on if the communications session has ended. If no, the method loops back to Block 606 to continue determining network latency. If the communications session has ended, then the method ends at Block 620.

Furthermore, other aspects of the computing system and the client computing devices may take the form of a computer program product stored by one or more computer-readable storage media having computer-readable program code, or instructions, embodied in or on the storage media, for operation thereof. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing system comprising:
   first and second client computing devices configured to access a communications network to establish a communications session, each client computing device comprising an audio analysis agent;

said first client computing device is configured to operate the audio analysis agent to perform the following:
      determine network latency within the communications session based on communications with the audio analysis agent in said second client computing device;
      in response to the network latency exceeding a latency threshold, analyze audio input from a user of said first client computing device to determine a speaking status of the user;
      and generate an indicator command message for said second client computing device based on the determined speaking status of the user; and
   said second client computing device configured to perform the following:
   display an indicator based on the indicator command message indicating when a user of said second client computing device can speak to avoid speech confliction with the user of said first client computing device;
   wherein determining the network latency is further based on the following:
      the audio analysis agent in said first client computing device transmits a monitoring message with a start timestamp;
      the audio analysis agent in said second client computing device applies an end timestamp upon receipt of the monitoring message;
      determine, by said first client device or said second client device, a time gap between the start and end timestamps; and
      compare the time gap to the latency threshold.

2. The computing system according to claim 1 further comprising additional client computing devices participating in the communications session, wherein the audio analysis agent in said first client computing device is further configured to perform the following:
   communicate with the audio analysis agents in said additional client computing devices to determine the network latency for each additional client computing device within the communications session; and
   select a worst network latency from among all of the determined network latencies to be used to compare to the latency threshold.

3. The computing system according to claim 1 wherein in response to the network latency exceeding the latency threshold, the audio analysis agent in said first client computing device further communicates with the audio analysis agent in said second client computing device to enable the indicator for said second client computing device.

4. The computing system according to claim 3 wherein the network latency is periodically determined, and in response to the network latency being less than the latency threshold, the indicator is disabled by said first client computing device.

5. The computing system according to claim 1 wherein the indicator displays at least one of colors, text or graphics to the user of said second client computing device to indicate the speaking status of the user of said first client computing device.

6. The computing system according to claim 5 wherein the colors include:
   a red color indicating that the user is talking;
   a yellow color indicating that there is a pause in the user speaking; and
   a green color indicating that the user has stopped talking based on the pause being extended.

7. The computing system according to claim 1 wherein said first and second client computing devices each comprise an audio buffer, and wherein the indicator command message includes the following:

a size of the audio buffer in said first client computing device representing audio data that has not been sent yet to said second computing device; and an indicator command for the indicator in said second client computing device to display a speaking status of the user of said first client computing device.

8. The computing system according to claim 7 wherein in response to there being a pause in the user of said first client computing device speaking, the audio analysis agent in said second client computing device displays the indicator based on the indicator command after the audio data has been received by the audio buffer in said second client computing device.

9. The computing system according to claim 1 wherein the audio analysis agent in said first client computing device analyzes the audio input from the user based on the following:

divide the audio input into a plurality of overlapping windows;

calculate signal energy of the audio input in each window; and compare the calculated signal energy in each window to an audio threshold, with the calculated signal energy below the audio threshold representing user silence, and with the calculated signal energy above the audio threshold representing that the user is speaking.

10. The computing system according to claim 1 wherein said first and second client computing devices are each configured to launch a collaboration app for the users to participate in a collaboration session, with the communications session operating within in the collaboration session.

11. The computing system according to claim 10 wherein the collaboration app is accessed via a virtual computing session, and wherein the indicator is configured as a plug-in to the collaboration app.

12. A client computing device comprising:

a display;

a processor coupled to said display and configured to perform the following:

access a communications network to establish a communications session with at least one other client computing device, and execute an audio analysis agent to perform the following:

determine network latency within the communications session based on communications with an audio analysis agent in the at least one other client computing device;

in response to the network latency exceeding a latency threshold, analyze audio input from a user of the client computing device to determine a speaking status of the user; and generate an indicator command message for the at least one other client computing device based on the determined speaking status of the user, with the indicator command message causing display of an indicator by the at least one other client computing device indicating when a user of the at least one other client computing device can speak to avoid speech confliction with the user of the client computing device;

wherein determining the network latency is further based on the following:

the audio analysis agent in said first client computing device transmits a monitoring message with a start timestamp;

the audio analysis agent in said second client computing device applies an end timestamp upon receipt of the monitoring message;

determine, by said first client device or said second client device, a time gap between the start and end timestamps; and compare the time gap to the latency threshold.

13. The client computing device according to claim 12 wherein in response to the network latency exceeding the latency threshold, the audio analysis agent further communicates with the audio analysis agent in the at least one other client computing device to enable the indicator for the at least one other client computing device.

14. The client computing device according to claim 13 wherein the network latency is periodically determined, and in response to the network latency being less than the latency threshold, the audio analysis agent further communicates with the audio analysis agent in the at least one other client computing device to disable the indicator for the at least one other client computing device.

15. The client computing device according to claim 12 further comprising an audio buffer, and wherein the indicator command message includes the following:

a size of the audio buffer representing audio data that has not been sent yet to the at least one other computing device; and an indicator command for the indicator in the at least one other client computing device to display a speaking status of the user of the first client computing device.

16. The client computing device according to claim 12 wherein the audio analysis agent analyzes the audio input from the user based on the following:

divide the audio input into a plurality of overlapping windows;

calculate signal energy of the audio input in each window; and compare the calculated signal energy in each window to an audio threshold, with the calculated signal energy below the audio threshold representing user silence, and with the calculated signal energy above the audio threshold representing that the user is speaking.

17. The client computing device according to claim 12 wherein said processor is further configured to launch a collaboration app for the users to participate in a collaboration session, with the communications session operating within in the collaboration session.

18. A method comprising:

operating a client computing device to access a communications network to establish a communications session with at least one other client computing device; and executing an audio analysis agent within the client computing device to perform the following:

determine network latency within the communications session based on communications with an audio analysis agent in the at least one other client computing device;

in response to the network latency exceeding a latency threshold, analyze audio input from a user of the client computing device to determine a speaking status of the user; and generate an indicator command message for the at least one other client computing device based on the determined speaking status of the user, with the indicator command message causing display of an indicator by the at least one other client computing device indicating when a user of the at least one other client computing device can speak to avoid speech confliction with the user of the client computing device;

wherein determining the network latency is further based on the following:

the audio analysis agent in said first client computing device transmits a monitoring message with a start timestamp;

the audio analysis agent in said second client computing device applies an end timestamp upon receipt of the monitoring message;

determine, by said first client device or said second client device, a time gap between the start and end timestamps; and compare the time gap to the latency threshold.

* * * * *